Figure 1:
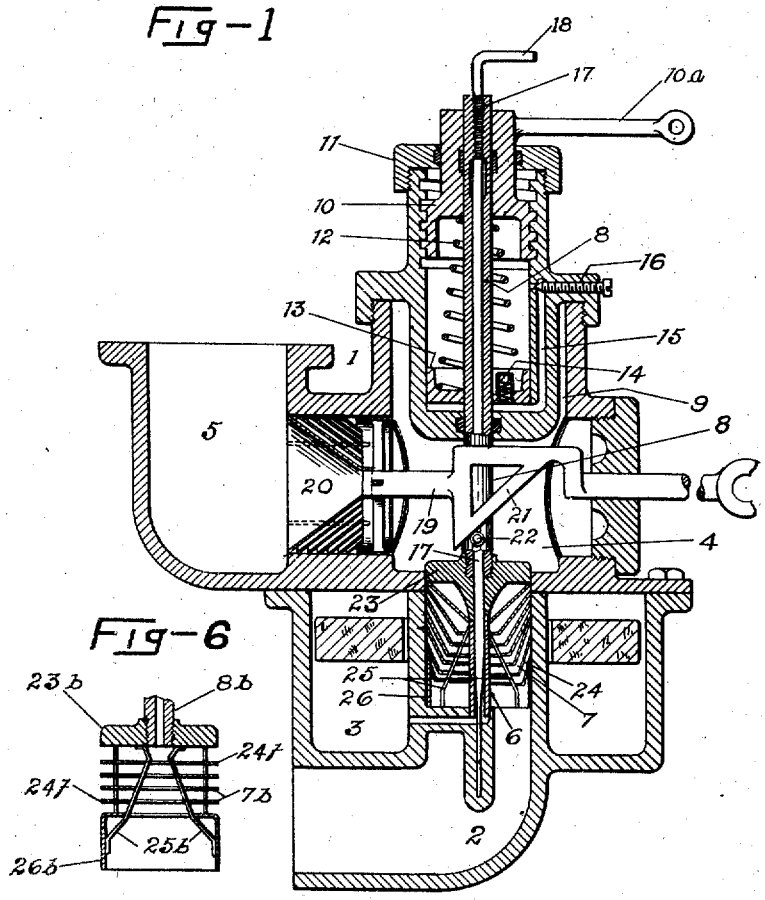

C. F. SCHULZ.

CARBURETER FOR GASOLENE ENGINES.

APPLICATION FILED SEPT. 25, 1916.

Reissued June 8, 1920.

14,880.

2 SHEETS—SHEET 1.

WITNESSES:

J. A. Mitchell

M. J. Bergenholtz

INVENTOR.

CARL F. SCHULZ

BY Albion D. T. Libby

ATTORNEY

C. F. SCHULZ.

CARBURETER FOR GASOLENE ENGINES.

APPLICATION FILED SEPT. 25, 1916.

Reissued June 8, 1920.

14,880.

2 SHEETS—SHEET 2.

WITNESSES:

J. A. Mitchell

M. E. Bergenholtz

INVENTOR.

CARL F. SCHULZ

BY Albion D. T. Libby

ATTORNEY

UNITED STATES PATENT OFFICE.

CARL F. SCHULZ, OF BROOKLYN, NEW YORK.

CARBURETER FOR GASOLENE-ENGINES.

14,880. Specification of Reissued Letters Patent. Reissued June 8, 1920.

Original application filed July 30, 1907, Serial No. 386,304. Renewed December 8, 1914, Serial No. 876,164. Original No. 1,169,574, dated January 25, 1916. Application for reissue filed September 25, 1916. Serial No. 122,160.

*To all whom it may concern:*

Be it known that I, CARL F. SCHULZ, citizen of the United States, residing at Brooklyn, Long Island, in the county of Kings and State of New York, have invented certain new and useful Improvements in Carbureters for Gasolene-Engines, of which the following is a specification.

This invention contemplates certain new and useful improvements in carbureters for engines or motors using gasolene or other liquid fuel of a volatile nature.

The primary object of my invention is a carbureter which will produce and feed to the motor a uniform mixture of gasolene and air at all speeds.

A further object of the invention is a device of this character which will fulfil to a maximum degree the conditions necessary to produce a successful carbureter—one which will be sensitive and give a uniform mixture at all speeds of the motor and in which the area of the air-inlet of the carbureter will vary with the speed of the motor, in which the fuel admitting element such as an induction tip or inspirator nozzle will vary as to its aperture, directly with the area of the air-inlet, and in that the throttle valve is so constructed that its area of opening will always bear a certain relation to the area of the air-inlet when the motor has attained to the speed allowed by the degree to which the throttle valve shall have been opened, that is, the air-admitting member or mixture valve is, conversely, so proportioned to the area of opening of the throttle valve that the opening of the said air-inlet can never exceed a certain limit so as to reduce the predetermined ratio. For instance, if the throttle piston or valve shall have been moved half its distance, the mixture valve or piston can move no farther than half its distance, although it may move not so far.

A further object of the invention is a simple and efficient construction of admission or mixture valve. And as subsidiary and yet useful objects, the invention aims to produce a compact structure wherein the reservoir or float chamber for the gasolene or other hydrocarbon may surround the air-inlet passage, and aims to impart steadiness at all times to the mixture valve, doing away with any fluttering, by the use of a fluid medium check which will be hereinafter specifically described.

Another important object of my invention is to provide a throttle valve that serves the additional purpose of further progressively breaking up the fuel and mixing it with the air so that a more finely divided and uniform mixture is furnished to the engine.

With these and other objects in view, as will more fully appear as the description proceeds, the invention consists in certain constructions, arrangements and combinations of the parts that I shall hereinafter fully describe and then point out the novel features in the appended claims.

Figure 2:
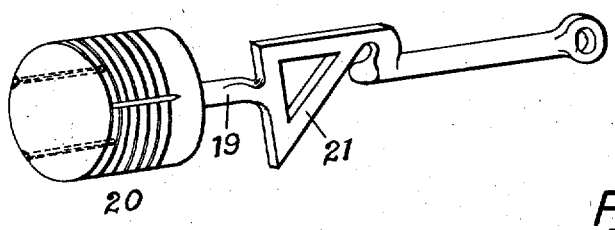
Figure 5:
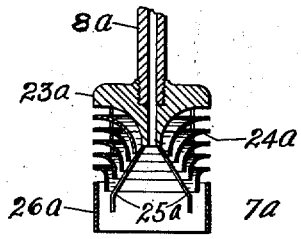
Figure 3:
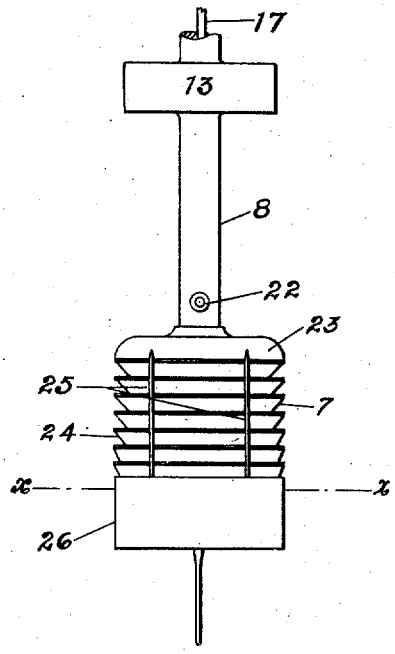
Figure 4:
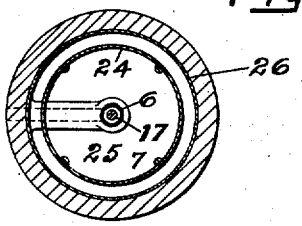

For a full understanding of the invention and the merits thereof and also to acquire a knowledge of the details of construction and the means for effecting the result, reference is to be had to the following description and accompanying drawings, in which:

Figure 1 is a vertical sectional view of a carbureter embodying the improvements of my invention. Fig. 2 is a detail perspective view of the throttle and its valve; Fig. 3 is a detail side elevation of the air-admitting member or mixture valve; Fig. 4 is a horizontal section thereof on the line *x—x* of Fig. 3. Figs. 5 and 6 are detail sectional views of modified forms of admission valves.

Corresponding and like parts are referred to in the following description and indicated in all the views of the drawings by the same reference characters.

Referring to the drawings, the numeral 1 designates the casing of my improved carbureter which is provided with the air-inlet passage 2 surrounded by the float chamber or reservoir 3 for the fuel. 4 designates the mixture chamber interposed between the air-inlet passage and the passage 5 leading to the cylinder of the engine, and 6 designates the inspirator nozzle or induction tip, which constitues the fuel admitting element, and which is mounted preferably centrally in the upper end of the air-inlet passage 2, said nozzle leading from the float chamber 3.

The air-admitting member or mixture valve 7 is mounted in the air-inlet passage 2 and controls the communication between the air-inlet passage and the mixture chamber 4, said valve being secured to one end of a plunger rod 8 which extends upwardly into and through a cylinder 9, which may contain air or other fluid. The upper end of the plunger rod 8 is mounted to move within the adjusting bushing or screw 10 which has a screw threaded engagement with the interior of the cylinder 9 at the upper end of the latter, and which is provided with a handle or lever 10[a], as shown. A cap 11 screws on the upper end of the cylinder 9, suitable packings being interposed between the cap and the bushing 10 and similar packing being mounted in the bottom of the cylinder, surrounding the plunger rod 8. An expansion spring 12, preferably helical as shown, is mounted, within the cylinder 9, with its upper end fitting within a socket in the lower end of the adjusting bushing or screw 10 and with its base or larger end fitting within a socket in the plunger 13. A check valve 14, which in the present instance, is shown as a spring seated ball valve, is mounted within the plunger 13 and opens downwardly so as to establish communication between the cylinder 9 above the plunger, and the cylinder 9 below the plunger, in connection with the bypass passage 15, same being susceptible to variation or adjustment by means of the adjusting screw 16. When the plunger 13 is moved upwardly or outwardly by the movement of the admission valve 7 toward the open position, it is obvious that such outward movement of the plunger will be governed by the tension of the spring in valve 14. The opposite movement of the plunger valve, that is, toward the closed position, will be controlled by the adjusting screw 16, of by pass 15.

A needle valve 17 extends entirely through the plunger rod 8 into the inspirator nozzle or induction tip 6, being movable with the plunger to open the induction tip for the passage of fuel therethrough. At its upper end, the said valve has a screw threaded connection with the plunger rod and its upper end is preferably bent as indicated at 18 to facilitate turning for adjustment.

19 designates a throttle which, in the present instance, is mounted so as to have a movement at right angles to the plunger rod 8 and which is provided with or carries a throttle valve 20 controlling the communication between the mixing chamber 4 and the passage 5 leading to the engine cylinder. This throttle is provided with a projection engaging member which in the present instance is in the form of a cam 21, the acting surface of which is preferably straight, and which extends obliquely to the direction of movement of the plunger rod, the latter being provided with an engaging element or projection of any character, such as a roller 22 designed to engage with the cam surface 21 so as to limit the upward movement of the plunger rod and valve 7 which it carries, at different elevations according to the position of the throttle.

An important feature of my invention resides in the construction and arrangement of the admission valves, namely the mixture valve and the throttle valve. To illustrate, reference is to be had to Figs. 1, 3, and 4, wherein is shown the construction of the admission valve governing the passage of air to the mixing chamber to draw the fuel into the same, by the partial vacuum created by the outward traverse of the engine piston. The said valve, it will be seen comprises a head 23 secured rigidly to the lower end of the plunger rod 8, and a series of annular portions 24, which may be of inverted frusto-conical form, held in spaced relation to each other, with their apices outermost, by means of a series of outer and inner longitudinal strips 25 soldered or otherwise secured to the cones and to the head 23, and to a sleeve 26 fitting snugly within the upper portion of the passage 2 and mounted to reciprocate therein as the plunger rod moves, the said sleeve so fitting the said passage to avoid any undue friction and yet at the same time prevent the passage of air between the respective walls of the sleeve and the passage. The annular portions 24 gradually increase in size or diameter at their outer ends, as clearly illustrated in the drawings and they vary as to their slant, this being made necessary by the conical formation produced by the set of annular portions about the inspirator nozzle or induction tip 6.

From the above description of the construction and arrangement of parts of the mixture valve 7, it being noted from the drawings that the series of annular portions surround the inspirator nozzle 6, it will be understood that as the valve 7 rises by the suction caused by the outward traverse of the engine piston, air will pass inwardly around the inspirator nozzle, through the series of annular valve portions that are exposed at the margin of the mixture chamber 4 according to the extent of movement of said valve. It will be seen that as the valve opens, the area of the space surrounding the upper end of the inspirator nozzle will be increased and that only that air which passes through this space can reach the cylinder of the engine, owing to the construction and arrangement of the spaced annular portions of said valve 7. Correspondingly, it will be noted that the extent of opening of the throttle valve 20 will determine the amount of mixture to pass to the engine cylinder, the throttle valve 20 being formed substantially like the valve 7 and embodying a plurality of annular portions arranged in spaced relation to each other. When the throttle is opened to any particular degree, the mixture will pass only through the annular portions of the throttle valve and out where the outer ends of such portions are exposed in the outlet passage. For instance, in order to ascertain just how much mixture is passed into the cylinder, it would only be necessary to follow the line of the annular valve portion nearest the outer edge of the passage between the mixture chamber and the passage 5 toward the throttle rod 19. It will be seen with this construction of throttle valve that the fuel and air are caused to traverse narrow passages which tend more minutely, due to their spreading effect at high velocity, to break up the fuel and mix it with the air whereby a better mixture is obtained in the engine cylinder and better economy obtained. This feature is especially advantageous where heavier fuels are used. It is to be understood that the throttle rod 19 may be moved in any desired manner as is customary in this class of device, by any suitable connection with a foot lever or connection to the steering post.

It is to be understood that my invention is not limited in the construction of the valve to annular portions of any specific form or construction. For instance, as illustrated in Fig. 5, the mixture valve may comprise a head $23^a$ and a series of spaced annular portions $24^a$ in the form of tubes with longitudinally flared or curved walls, secured to said head and the hollow piston $26^a$, as by means of strips $25^a$, the said annular portions increasing in diameter at their inner edges so as to produce around the inspirator nozzle a series of air-inlet passages that vary in area as the speed of the engine varies. Or, as illustrated in Fig. 6, the mixture valve may comprise a head $23^b$ and a series of spaced annular portions $24^b$ in the form of apertured disks connected to the head and to the sleeve $26^b$ as by the strips $25^b$, it being evident that such construction will accomplish a similar result.

From the foregoing description in connection with the accompanying drawings, it will be seen that I have provided a carbureter in which the area of the air-inlet opening surrounding the inspirator nozzle 6 will vary with the suction of the engine, in which the aperture of the induction tip of nozzle 6 varies directly with the area of the air-inlet, and in which the throttle valve is so constructed that its area of opening bears a certain proportion to that of the air-inlet when the motor has attained to the speed allowed by the degree to which the throttle has been opened, the projection 22 on the plunger rod contacting with the cam 21 and thereby limiting the upward movement of the plunger rod at an elevation determined by the degree to which the throttle rod 19 has been moved inwardly. This latter feature is an important one, as it prevents abuse of the engine by an excessive opening of the throttle valve in the operation of climbing hills and on bad roads when the motor can run but slowly, it being understood that the expansion spring 12 will then hold down the air valve to the proper position to suit the conditions under which the motor is working.

With reference to the check device, it is manifest that the rise of the air inlet valve may be controlled by the spring in check valve 14 and the fall by the screw 16 operating the by-pass 15. This imparts steadiness to the air-valve and does away with the fluttering and is, I believe an important feature of the invention, although I do not deem it indispensable, as the carbureter will work to good advantage without the check. By manipulating the lever or handle $10^a$ of the adjusting screw 10, the tension spring 12 in the check device may be increased or decreased to suit the existing conditions. By increasing the tension, the motor is more readily charged with the gasolene or vapor, as more resistance is offered to the entering air and by decreasing the tension, the reverse is true.

As the gasolene float chamber 3 surrounds the vertically extending air-inlet tube or passage 2, compactness results and there is insured a more constant level of the fuel, the level being maintained more independent of any tilt of the machine.

It will be seen that in every form of mixture inlet valves hereinbefore described, the said valve as a whole is substantially cylindrical in shape and embodies an opening which surrounds the inspirator nozzle and which gradually increases in area or capacity as it extends toward the air inlet passage. Said mixture inlet valve is also provided with a series of passages extending outwardly from the said central opening, said passages being formed for instance by the spaces between the annular portions or elements of the valve, such passages or channels admitting air into the mixture chamber 4 in different volumes according to the extent to which the said valve is moved into said chamber. It will of course be understood that the carbureter herein shown and described is illustrative of my invention and that changes may be made in the construction without departing from the spirit of the invention and scope of the claims.

Having thus described the invention, what is claimed as new is:—

1. In a carbureter, the combination of a casing provided with an air inlet and a mixture outlet, an inspirator nozzle, a valve controlling said nozzle, a mixture valve movable by suction toward open position, a throttle valve, and means for limiting the movement of the inspirator nozzle valve, the mixture valve being movable by suction toward open position approximately proportionate to the degree of opening of the throttle valve, the mixture valve being movable toward closed position independently of the movement of the throttle and means connected with the throttle arranged to limit the extent of opening around the inspirator nozzle proportionate to the degree of opening of the throttle.

2. In a carbureter provided with an air inlet passage, an inspirator nozzle therein, a mixture outlet passage, a throttle valve interposed between the air inlet passage and the outlet passage, a mixture inlet valve surrounding the tip of the inspirator nozzle and varying the area of the opening around said tip according to the degree of movement of said valve toward open position, a needle valve controlling the outlet aperture of the inspirator nozzle and movable with the mixture inlet valve and designed to vary the said opening of the inspirator nozzle proportionately directly to the area of the space surrounding the tip of the nozzle, and means limiting the movement of the mixture inlet valve and inspirator nozzle valve toward open position at points proportionate to the degree of opening of the throttle valve.

3. A carbureter, comprising a casing provided with an air inlet passage and a mixture outlet passage and a mixture chamber interposed between the two, an inspirator nozzle in the air inlet passage, a mixture inlet valve surrounding the inspirator nozzle and designed to provide a space around the same increasing in area according to the degree of opening of said mixture inlet valve, a plunger rod to which the mixture inlet valve and needle valve are connected for simultaneous movement, said plunger rod being provided with an engaging element, and a throttle provided with a throttle valve designed to vary the opening between the mixture chamber and the outlet passage according to the position of the throttle, the said throttle being provided with a cam surface with which the engaging element on the plunger rod is designed to abut whereby to limit the upward movement of the rod proportionate to the degree of opening of the throttle.

4. A carbureter provided with an inspirator nozzle, a mixture inlet valve surrounding the inspirator nozzle, manually operable throttling means, said mixture inlet valve being arranged to vary the opening around the inspirator nozzle up to a limit determined by the position of the manually operable throttling means, the carbureter being also provided with a mixture chamber and the mixture inlet valve formed to permit the passing therethrough into the mixture chamber of a series of annular air currents that, due to suction, take up contiguous positions as they enter the carbureting chamber, and a tapering valve mounted in and controlling the inspirator nozzle and movable with and controlled by the mixture inlet valve, whereby the inspirator nozzle will also be opened to various degrees up to a limit determined by the position of the throttling means and proportionate to the area of the air space around the inspirator nozzle.

5. In a carbureter provided with a mixture chamber and an air inlet passage communicating therewith a mixture inlet valve mounted in said passage and comprising annular portions, and means for holding said annular portions together in spaced relation to each other, said valve being formed to permit entrance into the carbureting chamber of annular currents that, due to suction take up contiguous positions as they enter the carbureting chamber, an inspirator nozzle, and a valve therefor operated by said mixture inlet valve.

6. In a carbureter having a primary air inlet passage, a fuel nozzle disposed in said air passage, a needle valve controlling the fuel nozzle, means for raising the needle valve from its seat upon each suction stroke of the engine, means movable with the needle valve upon each suction stroke controlling and varying the area of the air column passing up beside the fuel nozzle in proportion to the degree of opening of the needle valve, an adjustable throttle valve, and means connected to and movable with the throttle valve for adjustably limiting the degree of opening of said needle valve and the air controlling means proportionate to the degree of opening of the throttle.

7. In a carbureter having a primary air inlet passage, a fuel nozzle disposed within said air passage, a needle valve controlling the fuel nozzle, means for raising the needle valve off its seat upon each suction stroke of the engine, means movable with the needle valve upon each suction stroke controlling and varying the area of the air column passing up beside the fuel nozzle in proportion to the opening of the needle valve, a throttle valve, and means connected with the throttle valve arranged to limit the extent of opening of said air controlling means proportionate to the degree of opening of the throttle.

8. In a carbureter having a primary air inlet passage, a fuel nozzle disposed in said air passage, a needle valve controlling the fuel nozzle, means for raising the needle valve off its seat upon each suction stroke of the engine, means movable with the needle valve upon each suction stroke arranged to limit the extent of opening around the fuel nozzle proportionate to the degree of opening of the needle valve, and manually operable adjustable means adjustably limiting the extent of opening of said needle valve and the air controlling means upon each suction stroke.

9. In a carbureter, the combination with a fuel supply valve and a primary air supply valve movable with said fuel valve and controlling the area of the air column passing up beside the fuel valve and likewise controlling the primary air supply to the carbureter chamber, of means operated by suction for operating said valves, and independent manually adjustable means for limiting the degree of opening of said fuel valve and the degree of opening of said primary air supply valve.

10. In a carbureter, the combination of a casing provided with an air inlet and a mixture outlet, an inspirator nozzle in the air inlet, a valve controlling the passage of fuel through said nozzle, a mixture valve movable by suction toward open position and controlling and varying the area of the air column passing up beside and immediately adjacent said inspirator nozzle, a manually operated movable stop for adjustably limiting the movement of the mixture valve and correspondingly limiting the movement of the inspirator nozzle valve, the movement of the mixture valve being proportionate to the movement of said stop, the mixture valve being movable toward closed position independently of any movement of said stop, and means arranged to limit the extent of opening around and immediately adjacent the inspirator nozzle proportionate to the degree of movement of said stop.

11. In a carbureter having a primary air inlet passage, a fuel nozzle disposed within said passage, a fuel valve controlling the passage of fuel through said nozzle, an adjustable stop controlling the degree of opening of the fuel valve, and means adjustably limiting the area of the air passage immediately surrounding the nozzle proportionate to the degree of opening movement of said stop.

12. In a carbureter, the combination of a casing provided with an air inlet and a mixture outlet, an inspirator nozzle in the air inlet, a valve controlling the passage of fuel through said nozzle, a mixture valve movable by suction toward open position and controlling and varying the area of the air column passing up beside said inspirator nozzle, a manually operated movable stop for limiting the movement of the mixture valve, means for limiting the movement of the inspirator nozzle, valve, the movement of the mixture valve being proportionate to the movement of said stop, the mixture valve being movable toward closed position independently of the movement of said stop, and means arranged to limit the extent of opening around the inspirator proportionate to the degree of movement of said stop.

13. A carbureter including an air inlet passage, a fuel inlet valve disposed centrally of the passage, the passage being circular in section and surrounding the valve, a throttle valve, means for enlarging or decreasing the cross sectional area of the air passage surrounding the fuel valve, and means operable by the throttle valve for limiting the cross sectional area of the passage, the means for increasing or decreasing the cross sectional area of the passage being operated by suction.

14. A carbureter having an air inlet passage and fuel outlet passage, a suction operated multiple passage fuel inlet valve located in the inlet passage, a multiple passage throttle valve located in the outlet passage, and a cam carried by the throttle valve to limit but not cause opening of the fuel valve, and means independent of the cam for adjusting the suction operated fuel valve, said multiple passages in both said valves being brought into operation successively.

15. A carbureter including a fuel supply nozzle and fuel valve controlling supply of fuel through the nozzle, a primary air valve surrounding the nozzle and in one position engaging against it throughout its periphery, said primary air valve, in all positions surrounding the nozzle but being spaced a more or less distance away from it, connecting means between the primary air valve and fuel valve, whereby opening of the air valve causes corresponding opening of the fuel valve, means independent of the air valve for adjusting the fuel valve, a throttle valve, and means carried by the throttle valve acting as a stop to limit the opening of both the air valve and fuel valve.

16. In a carbureter, the combination with a suction operated air valve, of a fuel valve opened by opening the air valve, a dash pot for steadying the opening of the air valve, a throttle valve, and means carried by the throttle valve for limiting the opening of the air valve and consequently of the fuel valve, said fuel valve being adjustable with respect to the air valve.

17. A carbureter comprising a casing having a fuel chamber connection, a mixing chamber, an inlet at one end of said mixing chamber, an outlet and a throttle having a series of annular passages disposed one within the other in said outlet, said mixing chamber being between said inlet and said outlet, an air and fuel controlling member slidably mounted in said casing and coöperating with said inlet, said air and fuel controlling member having a series of annular passages disposed one within the other, said passages opening into their respective working positions successively, as and for the purpose described.

18. A carbureter comprising a casing having a fuel chamber connection, a mixing chamber, an inlet at one end of said mixing chamber, an outlet and a throttle in said outlet, said throttle having a series of annular passages made up of inverted frusto-conical members located one within the other suitably spaced and supported, said mixing chamber being between said inlet and said outlet, an air and fuel controlling member slidably mounted in said casing and coöperating with said inlet, said air and fuel controlling member having a series of annular passages made up of inverted frusto-conical members located one within the other suitably spaced and supported, said passages in both valves opening to their respective mixture positions in the operation of the valve, successively, as and for the purpose described.

19. A carbureter comprising a casing having a fuel chamber connection, a mixing chamber, an inlet at one end of said mixing chamber, an outlet and a throttle having a series of passages in said outlet, said mixing chamber being between said inlet and said outlet, an air and fuel controlling member slidably mounted in said casing and coöperating with said inlet, said air and fuel controlling member having a series of passages like those in said throttle valve, said passages in both valves opening successively to their respective mixture positions in the operation of the valves and means for steadying the movement of said air and fuel controlling member.

20. A carbureter comprising a casing having a fuel chamber connection, a mixing chamber, an inlet at one end of said mixing chamber, an outlet and a throttle having a series of annular passages in said outlet, said mixing chamber being between said inlet and said outlet, an air and fuel controlling member slidably mounted in said casing and coöperating with said inlet, said air and fuel controlling member having a series of annular passages like those in said throttle valve, said passages in both said valves opening successively to their respective positions in the operation of the carbureter and means for adjusting the fuel with relation to the air while said carbureter is in operation.

21. A carbureter comprising a casing provided with a fuel chamber, a mixing chamber, an air inlet port to said mixing chamber, and an outlet therefrom, an air valve and a fuel admission valve both vertically mounted together and slidable in said casing, whereby said air valve coöperates with said port, said air valve having a stem, a guide tube for said stem, a piston moving with said valve and adapted to steady its action, said valve being made up of a series of cone shaped structures located one within the other and providing in its movement a plurality of substantially successive entrances to the mixing chamber.

22. In a carbureter provided with a mixture chamber and an air inlet port thereto, a valve coöperative with said port, means for admitting fuel to said mixture chamber, an outlet from said mixture chamber, a throttle coöperating with said outlet, said throttle having a series of annular mixture passages adjacent to each other, and adapted to be brought into operation successively.

23. In a carbureter for internal combustion engines, the combination of an air inlet passage and a passage leading to the engine, a chamber between said passages, a fuel nozzle located in said air inlet passage and extending toward said chamber, an inlet valve carrying a fuel valve and controlling the air and fuel entering said chamber, said valve having a plurality of inlet passages disposed one within the other and brought into operation successively, a throttle valve located between said chamber and the passage leading to the engine, said throttle valve having a plurality of passages disposed one within the other and brought into operation successively as and for the purpose described.

24. In a carbureter, the combination of a mixing chamber having an inlet port and an outlet port, a suction operated air valve carrying a fuel valve coöperating with said inlet port for admitting air and fuel into said mixture chamber, a throttle valve located in said outlet port constructed to permit successive entrances into the chamber beyond of rapidly spreading and intermingling air and fuel currents which have been partially mixed in said mixing chamber as and for the purpose described.

25. In a carbureter, the combination of a chamber wherein fuel and air can be mixed, an inlet port for said chamber and an outlet port leading to a second chamber wherein the fuel and air from the first mentioned chamber may be received, a suction operated air valve carrying a fuel valve adapted to cooperate with said inlet port for admitting air and fuel into the first mentioned chamber, a throttle valve in said outlet port having passages brought into operation successively as said valve is operated, whereby the fuel and air from the first mentioned chamber is spread out in thin sheets which are rapidly thrown together into the chamber beyond said throttle valve.

26. In a carbureter, the combination of, an outlet passage, an inlet passage, a mixing chamber positioned therebetween, a fuel supplying means, an intake valve controlling the admission of air and fuel into said mixing chamber, a throttle valve between the mixing chamber and the outlet passage, both said intake and throttle valves being made up of a series of annular portions one within the other but in spaced relationship for the purpose of securing a good mixture of air and fuel as described.

27. In a carbureter, the combination of, an outlet passage, an inlet passage, a mixing chamber positioned therebetween, a fuel supplying means, an intake valve controlling the admission of air and fuel into said mixing chamber, a throttle valve between the mixing chamber and the outlet passage, both said intake and throttle valves being adapted in their operation to bring into action successively a series of passages carrying air and fuel substantially as and for the purpose described.

In witness whereof I affix my signature.

CARL F. SCHULZ.

Witness:

E. C. WINTRINGHAM.